(No Model.) 4 Sheets—Sheet 1.
P. J. VANDERLINDA.
CHOCOLATE COATING MACHINE.

No. 601,217. Patented Mar. 22, 1898.

Witnesses:
George H. White
H. M. Dickinson

Inventor.
Peter J. Vander Linda,
By
Ithiel J. Cilley
Attorney.

(No Model.) 4 Sheets—Sheet 2.

P. J. VANDERLINDA.
CHOCOLATE COATING MACHINE.

No. 601,217. Patented Mar. 22, 1898.

Witnesses:
George H. White.
H. M. Dickinson

Inventor.
Peter J. Vanderlinda.
By Ithiel J. Cilley
Attorney.

(No Model.)  
4 Sheets—Sheet 3.
P. J. VANDERLINDA.
CHOCOLATE COATING MACHINE.
No. 601,217.  
Patented Mar. 22, 1898.
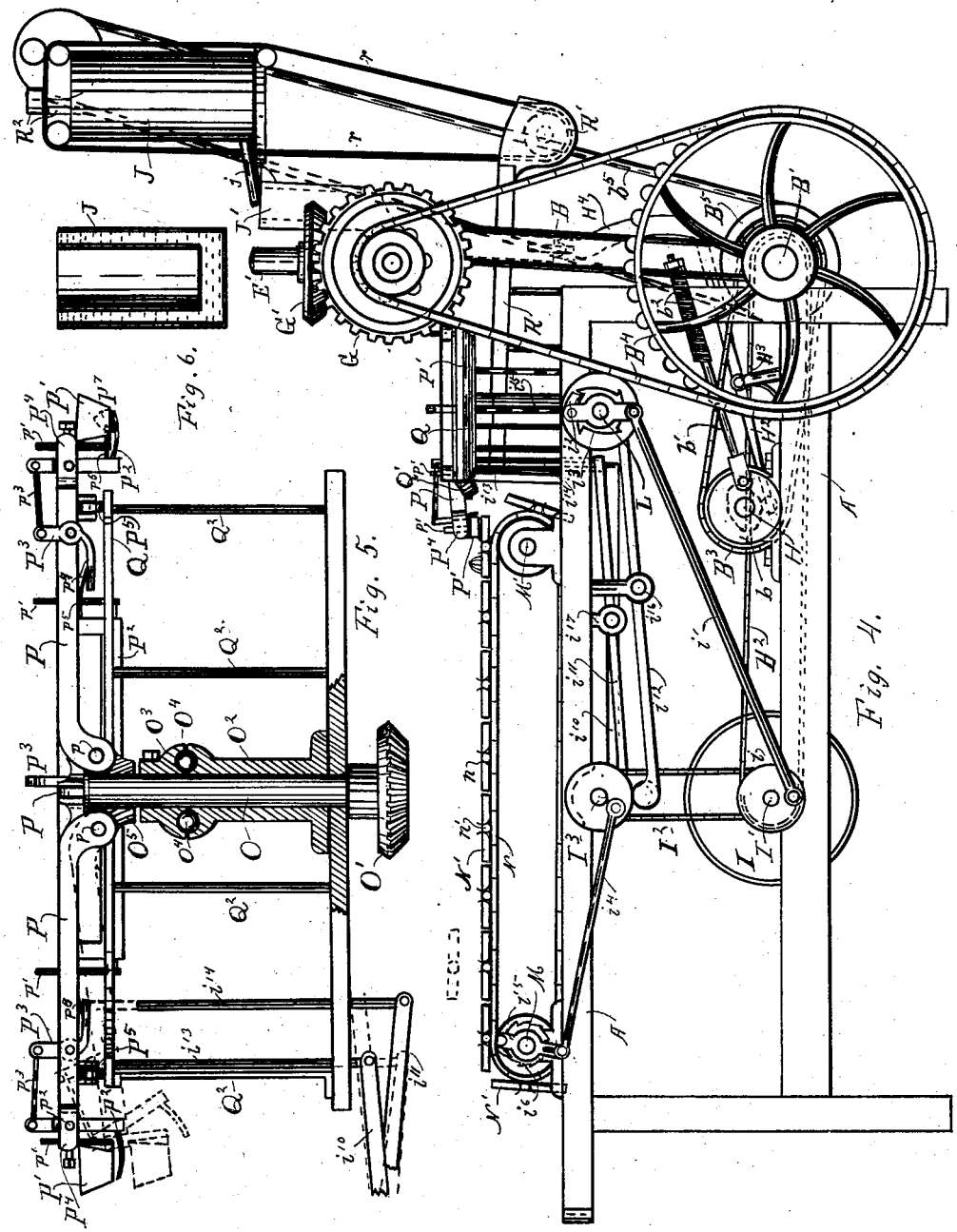
Witnesses:  
George H. White  
V. M. Dickinson
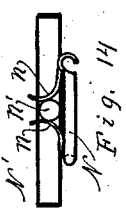
Inventor.  
Peter J. Vanderlinda.  
By Ichiel J. Cilley  
Attorney.

(No Model.)  P. J. VANDERLINDA.  4 Sheets—Sheet 4.
CHOCOLATE COATING MACHINE.

No. 601,217.  Patented Mar. 22, 1898.

Witnesses:
George H. White
H. M. Dickinson

Inventor.
Peter J. Vanderlinda
By
Ithiel J. Cilley
Attorney.

UNITED STATES PATENT OFFICE.

PETER J. VANDERLINDA, OF GRAND RAPIDS, MICHIGAN.

CHOCOLATE-COATING MACHINE.

SPECIFICATION forming part of Letters Patent No. 601,217, dated March 22, 1898.

Application filed June 11, 1894. Serial No. 514,257. (No model.)

*To all whom it may concern:*

Be it known that I, PETER J. VANDERLINDA, a citizen of the United States, residing at Grand Rapids, in the county of Kent and State of Michigan, have invented certain new and useful Improvements in Chocolate-Coating Machines, of which the following is a specification.

My invention relates to a machine for coating cream centers, caramels, nuts, or any material upon which chocolate or other similar coating is used; and its objects are, first, to provide a machine that will work continuously, covering a number of centers at each operation and will give to the coating the appearance of handwork; second, to economize the room necessarily occupied for chocolate-coating purposes; third, to provide an endless bed with movable trays that when filled may be set aside and replaced with empty ones, and, fourth, to provide a means of transferring the drippings of chocolate from the dripping-pan to the storage-tank. I attain these objects by the mechanism illustrated in the accompanying drawings, in which—

Figure 1:
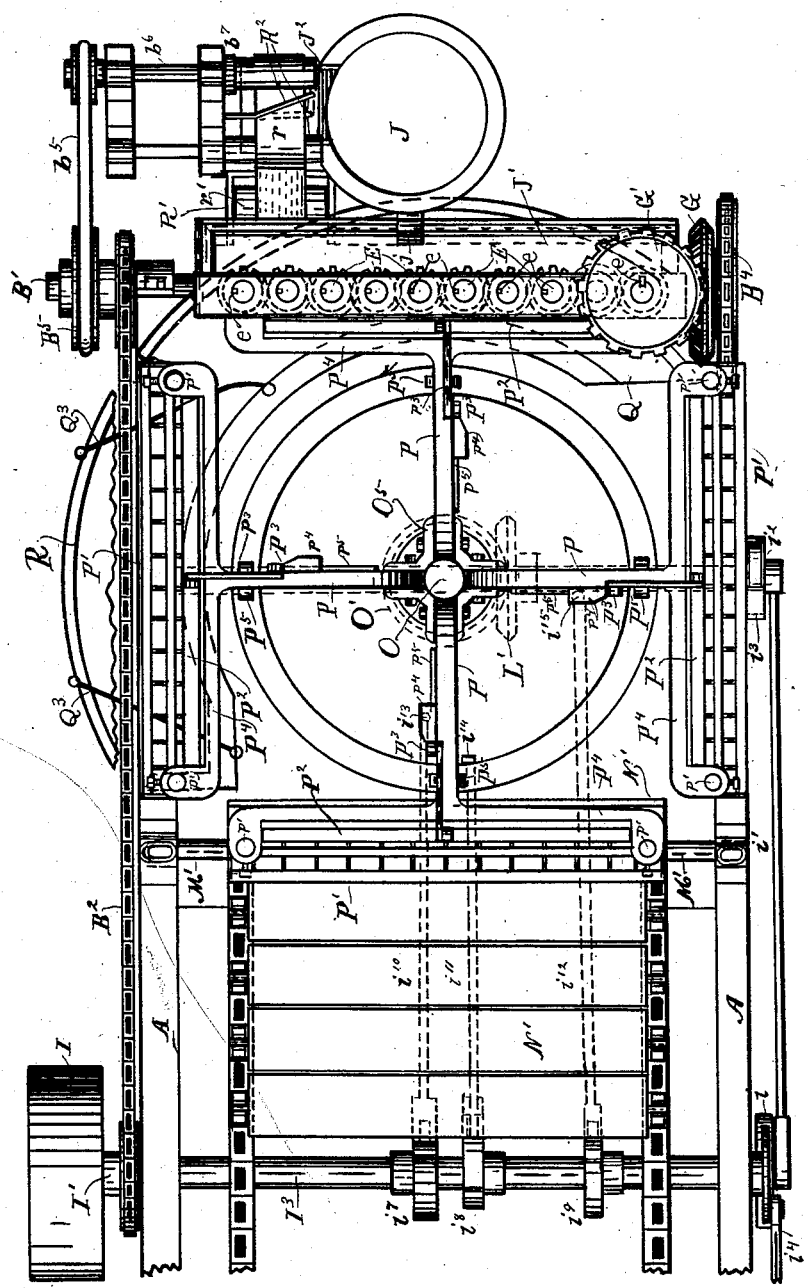
Figure 3:
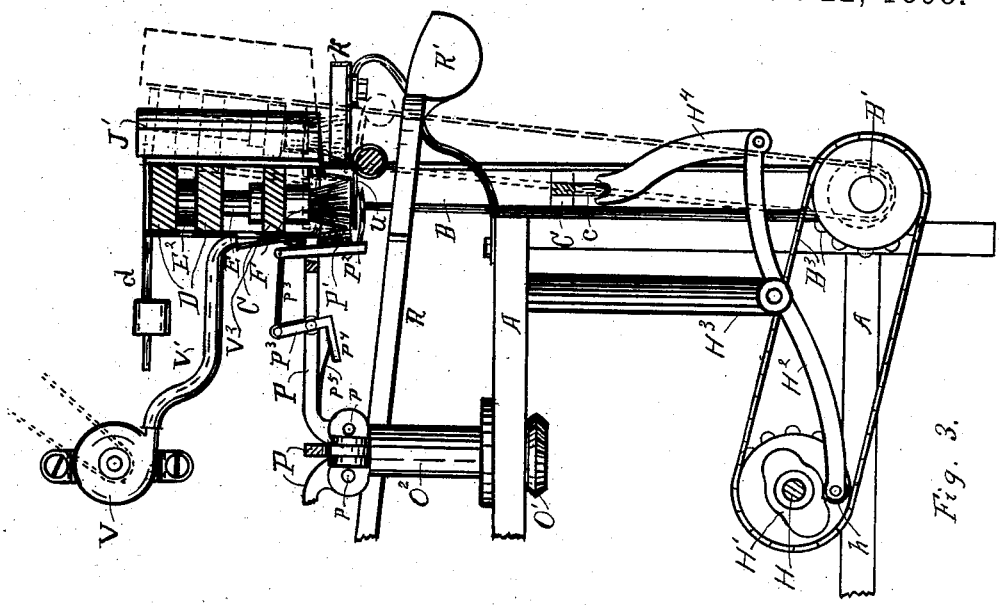
Figure 2:
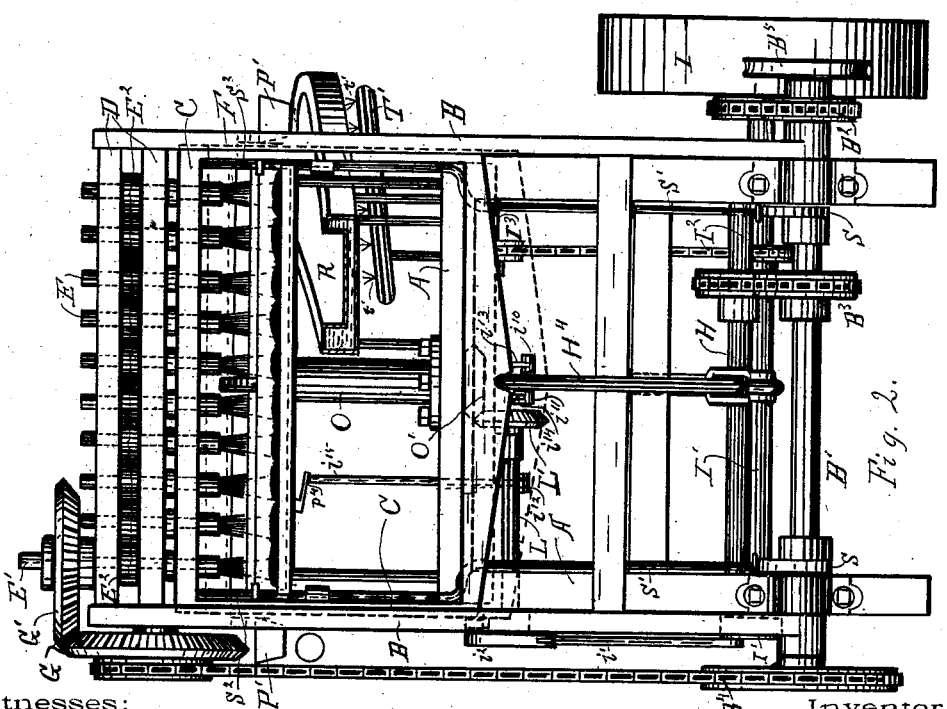
Figure 7:
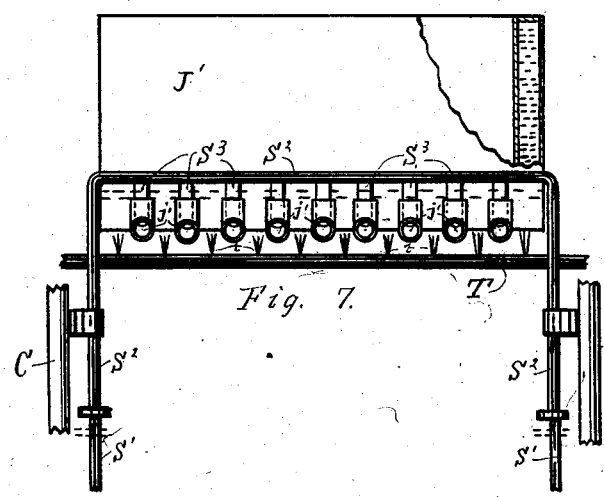
Figure 8:
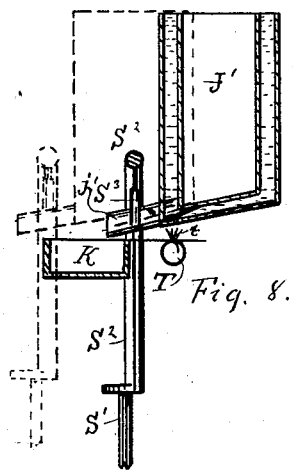
Figure 9:
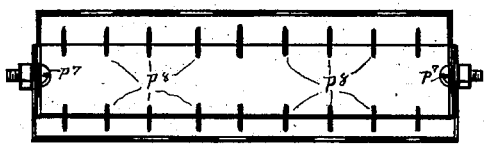
Figure 10:
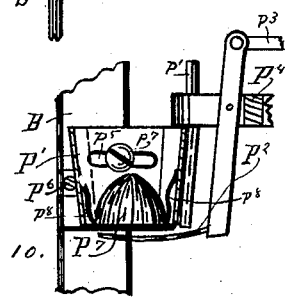
Figure 11:
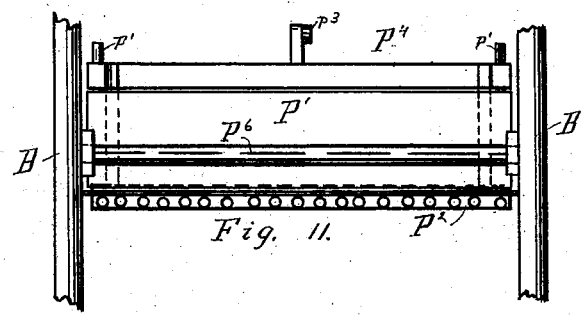
Figure 12:
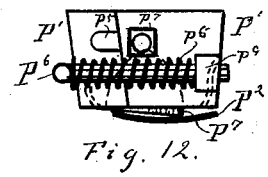
Figure 15:
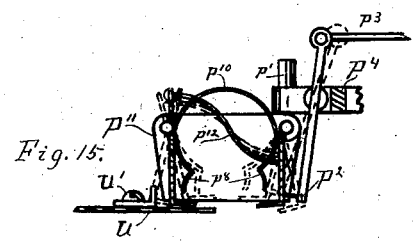
Figure 13:
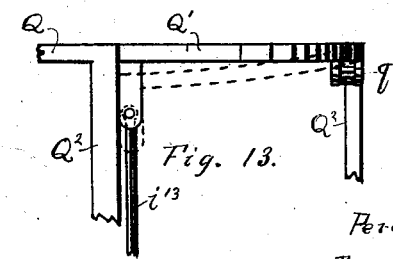

Figure 1 is a top plan of the working end of my machine. Fig. 2 is an end elevation of the same. Fig. 3 is a side elevation of the brush-frame in section and a portion of the end of the supporting-frame. Fig. 4 is a side elevation of the entire machine. Fig. 5 is an enlarged vertical section of the turn-table and the cups. Fig. 6 is a vertical section of the stationary chocolate-tank. Fig. 7 is a front elevation of the secondary chocolate-tank and its connections with the end of the tank cut away to show its water-chamber. Fig. 8 is a vertical cross-section of the same. Fig. 9 is a plan of the coating cup or trough. Fig. 10 is a transverse vertical section, Fig. 11 is a front elevation, and Fig. 12 is an end elevation, of the same. Fig. 13 is the adjustable section of the track. Fig. 14 is an end of a tray upon a link, and Fig. 15 is a modified form of the cup and supporting-shelf.

Similar letters refer to similar parts throughout the several views.

In the accompanying drawings, A is the main or supporting frame, and B is the brush-frame, which is pivoted upon the shaft B', so that the upper end may be made to oscillate to and from the main frame. The shaft B' is journaled upon the end of the main frame near the foot, as in Fig. 2.

The upper end of the brush-frame is provided with two cross bars or girts D, having vertical apertures or bearings for the spindles E and placed a proper distance apart to receive the driving-gears $E^2$ and allow them to revolve freely. These gears are secured to the spindles E by a spline or sliding key, as indicated at $e$ in Fig. 1, so that the spindles may slide easily lengthwise through the gear-wheels while being revolved thereby. The lower ends of these spindles are supported in bearings in the sliding sash C in such a manner that they will turn freely therein and at the same time will be made to slide longitudinally up and down by the oscillations of the sash.

The sash is fitted to slide freely in ways in the brush-frame and is vertically oscillated by the eccentric H' through the medium of the lever $H^2$ and the connecting-rod $H^4$. (See Figs. 2 and 3.) The eccentric H' is driven upon the shaft H, which in turn is driven by the sprocket chain and wheels $B^3$ from the shaft B' and is so formed that it will cause the sash to rise and fall twice with each revolution of the shaft, so that when the brush-frame drops back to the position indicated by the dotted lines in Fig. 3 the brushes will drop down into the chocolate-basin K and take up the chocolate, and when the frame is drawn up to the main frame, as indicated by the solid lines in Fig. 3, the brushes will be carried up over the rim of the chocolate-basin and down into the coating-cup P', and it is so timed that the brushes will always be up, so as to pass freely over the rims of the basin and cups when in transit from either position to the other and will make the complete downward and upward stroke while the frame is standing motionless in each position.

The brush-frame B is made to oscillate by means of the crank $b$ through the medium of the connecting-rod $b'$, which is attached at one end to the crank and at the other to the spiral spring $b^2$, the opposite end of the spiral spring being attached to the brush-frame in such position and the spring of such tensile strength that the brush-frame will be drawn to position against the main frame A when the crank has just passed the quarter, and the spring will then expand and allow the crank to carry around to the opposite center and nearly back to the opposite quarter before the frame will be allowed to drop back from the perpendicular to the position indicated in Fig. 4 and by the dotted lines in Fig. 3.

The shaft B' is driven from the main shaft I' by means of the sprocket-chain $B^2$, and the brushes F are made to revolve by means of a sprocket wheel and chain $B^4$, transmitting motion from the shaft B' to the bevel-gear G, which in turn drives the bevel-gear G', and with it the spindle E', which, through the medium of the gear-wheels $E^2$, transmits its motion to the spindles E and causes the brushes to revolve continuously.

My appliance for carrying the stock to and from the brushes to receive the coating of chocolate consists of a turn-table having a series of cups P', supported by the yokes $P^4$ at the ends of the arms P, the opposite ends of the arms being pivoted to the head $O^5$, which is secured to the vertical shaft O, (see Figs. 1 and 5,) which is supported in the vertical bearing $O^2$ to turn freely, and to adjust its height I provide a collar $O^3$, that I fasten securely to the shaft, and to prevent friction and avert the necessity of using oil as a lubricant, which is very objectionable at this place, I make a ball-bearing connection $O^4$ between the two. To the lower end of this shaft I secure a miter-gear O', which is designed to mesh with and be driven by a corresponding miter-gear L' (see Figs. 1 and 2) on the shaft L.

The manner of revolving the shaft L is best shown in Fig. 4, where I show a ratchet-wheel $i^3$ secured to this shaft and having the same number of teeth upon its periphery that there are arms P and so timed that each arm will come to position under the brushes simultaneously with bringing the brush-frame to a vertical position. This ratchet-wheel is operated by a pawl $i^2$, also pivoted to the shaft L, as shown, and connected by means of the connecting-rod $i'$ with the crank $i$ on the main shaft I', so that each revolution of the main shaft will carry one arm away from and the next succeeding one to position under the brushes.

I provide a track Q for the support of the outer ends of the arms P, and for lessening the friction I insert antifriction-rollers $P^5$ in bearings upon the lower side of the arms directly over the track.

I find that the most available form to construct my cups P' is to make two separate sides with the ends bent at right angles, provided with slots $P^5$, and held together by screws $P^7$, as shown in Figs. 9 and 10, the top and bottom being left open for the introduction and discharge of the stock. When made in this form, I secure a rod $P^6$ to the side of the cups opposite the arms, with the ends projecting by the ends of the cups in position to be engaged by the sides B of the brush-frame when it approaches them and push the outer half toward the inner one. The ends of this rod are bent at right angles and, passing across the end of the cup, work freely through the bearings $P^9$ on the opposite half of the cups, and to throw them apart I insert a spiral spring $P^6$ at each end. (See Figs. 10, 11, and 12.) This feature is intended to be operated only when the cup is adjacent to the brush-frame and is for the purpose of throwing the side springs $P^8$ in the cups against the sides of the stock or centers $P^7$ and prevent them from turning while the brushes are coating them and to release them as soon as the brushes have been raised up off of them.

The appliance for holding the centers from dropping out of the cups while in transit from the place of filling to the place of discharge is a series of fingers $P^2$, pivoted to the yokes $P^4$ in position so that the fingers will stand immediately beneath the cups. The upper ends of the bodies that support the fingers are connected through the medium of the rods with the angle-levers $P^3$, which are held to position by the springs $P^5$ until they reach the position over the transfer-trays N', directly opposite from the brush-frame. When the cups are directly over the transfer-trays, the arms drop down by the action of the eccentric $i^8$ through the medium of the lever $i^{11}$ and the standard $i^{14}$ upon the section Q' of the track, which is a detached portion of the main track, and pivoted thereto, as at $q$, so that the opposite end may drop down, which is so timed as to occur at the instant that the cup-arms reach it and stop, and it is raised to position again before the arms start upon the next section of their revolution, the distance of drop being just sufficient to hold the cups in close proximity to the surface of the trays when the eccentric $i^7$, through the medium of the lever $i^{10}$ and the standard $i^{13}$, will throw the angle-lever $P^3$ over in such position that the fingers $P^2$ will be drawn from under the cups and the stock will drop out upon the tray, the raising of the cup-arms taking place before the trays are carried from under them.

The trays N' are supported upon endless sprocket-chains N and are driven by a ratchet $i^6$ and pawl $i^5$, (see Figs. 1 and 4,) supported on the shaft M and driven from the crank on the shaft $I^3$ by means of the connecting-rod $i^4$. The ratchet $i^6$ is so constructed that it will require several motions of the pawl to move the width of a tray from under the cups, thus providing for storing several rows of coated centers upon each tray.

To secure the trays to the links of the chains, I place spring-bearings $n$ $n$ upon certain of the links in proper position, so that the journals $n'$ on the trays may be readily pressed down between them or drawn up out of them. (See Figs. 4 and 14, both on Sheet 3 of the drawings.)

For the purpose of averting the danger of carrying the drippings of chocolate around to the trays I place one or more scrapers $Q^3$, of rubber or other suitable material, beneath the cups, between the brush-frame and the trays, in position to scrape the chocolate from the cups, and place a dripping-pan R around the front end and one side of the machine to catch the chocolate as it drops from the cups. The scrapers $Q^3$ are secured to the pan R in the line of travel from the brush-frame to the trays hereinbefore described. To keep the chocolate flowing through this pan, I make the pan hollow, as shown in section in Fig. 2, and fill this hollow portion with water and heat it with a gas-jet, as at T', or other suitable appliance, so that the chocolate will be kept warm enough to flow freely without danger of "burning on," and I place a receptacle R' at the outer end of this pan (see Fig. 4) to catch the chocolate as it flows out, the pan being inclined downward toward said receptacle, so that the chocolate will flow into it freely.

My chocolate storing and heating device consists of a stationary tank J, situated above the brush-frame, and a movable tank J', secured to the brush-frame above the brushes in position to receive the heated chocolate from the stationary tank and to discharge it in position to be taken up by the brushes and transferred to the centers to be coated. Both of these tanks are constructed with hollow walls and the space between filled with water, which may be heated by any of the known appliances—as a gas-jet, a steam-pipe, &c.— to insure perfect fluidity of the chocolate without danger of burning it.

To transfer the chocolate from the dripping-pan receptacle R' to the stationary tank J, I place an idler $r'$ into the receptacle and pass a belt $r$ therefrom to and over the tank, as shown in Figs. 1 and 4, with scrapers $R^2$ to scrape the chocolate from the belt in position to flow into the tank. This belt is driven from the shaft B' by means of the belt $b^5$ from the pulley $B^5$ over the shaft $b^6$. In Fig. 1 $J^3$ represents a drain from this belt to the tank, and $b^7$ represents the driving of an idler by means of a gear-wheel, so that the belt here passes between two pulleys, as shown in Fig. 4. The shelf $u$, secured to the brush-frame in Fig. 3, is designed to pass between the bottom of the cup and the supporting-frame $P^2$ and support the centers while they are being coated and to be withdrawn with the back stroke of the brush-frame to leave the coated centers free to drop down upon the fingers.

My appliance for governing the feeding of the melted chocolate from the intermediate storage-tank J' to the brushes consists of a series of tubes $j'$, provided with automatic valves $S^3$, mounted upon the rod or yoke $S^2$ in such a manner that raising and lowering the rod will simultaneously open or close the tubes, as indicated in Fig. 7, and to raise and lower the yoke I place two eccentrics S S upon the shaft B' in position to raise and lower the rods S', which are supported at each side of the brush-frame, as in Fig. 2, in position to stand directly under and to raise and lower the yoke or rod $S^2$, to which the valves are secured. Though I do not restrict myself to the use of this particular form and construction of valve, I find it the cheapest and most available valve for this purpose.

I find that the most available means of cooling the chocolate as it is being coated upon the centers, so as to prevent dripping when leaving the brushes, is to place a small rotary blower, as V in Fig. 3, in a suitable position and connect it with the brush-frame by means of a flexible pipe V' and a thin broad nozzle $V^2$ in position to throw a blast of air into the cups during and after the time the brushes are coating the chocolate upon the centers.

In Fig. 15 I show another form of my transfer-cup. In this form the two ends of the cups are secured to the yokes $P^4$ by means of the supports, the same as is shown in connection with my ordinary cups, and the sides are each pivoted from its upper edge to the upper outside corners of the ends, so that the lower edges are free to swing out and in. I bend the lower edges of the sides nearly to right angles for a short distance back to form a base or bottom to the cups to support the centers, and above these bottoms I secure the springs $p^8$, hereinbefore mentioned, of any available form, to prevent the centers from turning when being acted upon by the brushes. With this cup I use a neutral point-spring $p^{10}$, that holds its sides in position, so that the centers will rest upon the bottoms of the cups and the springs $p^8$ will not engage them, and I dispense with the fingers $P^2$, but use their supporting-frame to swing the sides simultaneously by means of the connecting-rod $p^{12}$, passing from below the pivot-line of the inner side and attached to the outer side at a point above the pivot-line, as shown, so that when the angle-lever $P^3$ is thrown forward both sides of the cup will swing open, as shown by the outer dotted lines. To throw the sides together so that the springs $P^8$ will engage the centers when being acted upon by the brushes, I place a gage $u'$ upon the shelf $u$ in position to press against the outer side when the brush-frame comes up to position, and will force both sides together by means of the connecting-rod $p^{12}$ to the position indicated by the inner dotted lines. For the purpose of throwing this cup slightly open when in position to be filled I place an eccentric $i^9$, a lever $i^{12}$, and a standard $i^{15}$ (see Figs. 1, 2, and 4) in position to act upon the angle-levers $p^4$ to throw them forward with the desired results.

The principal office of the shelf $u$ is to carry chocolate to and place it upon the lower sides or bottoms of the centers at the same time that the brushes are coating the upper portions.

Having thus fully described my invention, what I claim as new, and desire to secure by Letters Patent of the United States, is—

1. In a chocolate-coating machine, a permanent frame, a horizontally-oscillating frame pivoted thereto, a vertically-reciprocating sash, and revolving brushes supported in said oscillating frame, arms and cups made to rotate to and from the brushes, and an endless chain of trays for receiving and delivering the coated stock, substantially as, and for the purpose set forth.

2. In a chocolate-coating machine, a permanent frame, a horizontally-oscillating vertical frame pivoted at the lower end to the permanent frame and having a series of vertically-reciprocating revolving brushes journaled at the upper end, and a turn-table having arms and cups for carrying the stock to and from the brushes, substantially as described and shown.

3. In a chocolate-coating machine, a permanent frame, a horizontally-oscillating vertical frame pivoted at the lower end to the permanent frame, vertically-reciprocating revolving brushes journaled at its upper end, sprocket-wheels, a sprocket-chain, and a train of gear for revolving said brushes, a sash, an eccentric, and a connecting-rod for transmitting a vertical reciprocating motion to the brushes, a crank, an elastic and a connecting-rod for oscillating the brush-frame, and a turn-table having arms and cups for carrying the stock to and from the brushes, substantially as, and for the purpose set forth.

4. In a chocolate-coating machine a permanent frame, a horizontally-oscillating vertical frame pivoted thereto, a series of vertically-reciprocating revolving brushes journaled in the upper end of said frame, a turn-table, arms pivoted to said turn-table at one end, and provided at the other end with yokes, cups in said yokes for carrying the stock to and from the brushes, and fingers pivoted to the arms to be thrown to and from under the cups to hold and release the centers, and an eccentric, a lever, and a spring for operating said fingers substantially as and for the purpose set forth.

5. In a chocolate-coating machine a permanent frame, an oscillating brush-frame pivoted thereto, brushes supported and made to reciprocate longitudinally, and to revolve in said frame, a turn-table having arms and cups for carrying the stock to and from the brushes, a track for supporting said arms, one section of which is pivoted to rise and fall at one end, a lever and an eccentric for raising and lowering said section, an endless bed traveling from said turn-table, and detachable trays, upon said bed, for carrying the coated stock from the cups, substantially as, and for the purpose set forth.

6. In a chocolate-coating machine a permanent frame, an oscillating brush-frame, revolving brushes in said frame, a turn-table having arms, cups and fingers for carrying the stock to and from the brushes a crank, a connecting-rod, a pawl and a ratchet having teeth to correspond with the number of arms on the turn-table for revolving the turn-table, and a track for supporting the arms, substantially as, and for the purpose set forth.

7. In a chocolate-coating machine, a permanent frame, a brush-frame and brushes for coating the chocolate on the stock, a turn-table having arms and cups for carrying the stock to and from the brushes, an endless bed and trays for carrying the coated stock away from the cups, and a crank, a ratchet and a pawl for driving the bed, substantially as and for the purpose set forth.

8. In a chocolate-coating machine a permanent frame, an oscillating brush-frame pivoted thereto, reciprocating and revolving brushes in said frame, a turn-table having arms, cups and fingers for carrying the stock to and from the brushes, and a shelf upon the brush-frame to pass between the stock and the fingers when the stock is being coated, substantially as, and for the purpose set forth.

9. In a chocolate-coating machine a permanent frame, an oscillating brush-frame pivoted thereto, brushes journaled in said frame, a turn-table having arms and cups for carrying the stock to and from the brushes, and a dripping-pan, substantially as, and for the purpose set forth.

10. In a chocolate-coating machine a permanent frame, a brush-frame pivoted thereto, brushes made to revolve, and to reciprocate therein, cups for carrying the stock to and from the brushes, a chocolate storage and heating tank above the machine a chocolate-receiving tank on the brush-frame in position to discharge chocolate to the brushes, a dripping-pan, and a belt for conveying the drippings from the dripping-pan to the heating-tank substantially as, and for the purpose set forth.

11. In a chocolate-coating machine a permanent frame, a brush-frame pivoted thereto, transfer-cups, a storage-tank, a receiving-tank, and a receiving-basin for the chocolate, a dripping-pan under the transfer-cups and a conveyer-belt therefrom to the heating-tank, substantially as and for the purpose set forth.

12. In a chocolate-coating machine, a permanent frame, a brush-frame pivoted thereto, brushes arranged to revolve and to reciprocate longitudinally, a turn-table arms pivoted to said turn-table, transfer-cups divided longitudinally and a rod and spring for acting with the brush-frame to throw the cups together and apart, and a series of small wire springs at the bottom of the cups to engage the centers to prevent them from turning when being coated, substantially as and for the purpose set forth.

13. In a chocolate-coating machine a permanent frame, a brush-frame, storage-tanks, a turn-table having arms pivoted thereto and transfer-cups divided longitudinally, a rod and springs to act with the brush-frame to throw the sides of the cups to and from each other, substantially as specified.

14. The combination, in a chocolate-coating machine, of a permanent frame, a brush-frame pivoted thereto, and a turn-table thereon having arms pivoted to and radiating from its center, and transfer-cups; with a blower, connecting pipes and nozzle for cooling the chocolate as it is being coated upon the centers, substantially as and for the purpose set forth.

Signed at Grand Rapids, Michigan, this 29th day of May, 1894.

PETER J. VANDERLINDA.

In presence of—
ITHIEL J. CILLEY,
MYRON C. LISLE.